(12) United States Patent
Andersson

(10) Patent No.: US 6,892,913 B1
(45) Date of Patent: May 17, 2005

(54) BICYCLE HOLDER FOR VEHICLES

(75) Inventor: Göran Andersson, Borås (SE)

(73) Assignee: Mont Blanc Industri AB, Dalsjofors (SE)

( * ) Notice: Subject to any disclaimer, the term of this patent is extended or adjusted under 35 U.S.C. 154(b) by 57 days.

(21) Appl. No.: 10/362,075

(22) PCT Filed: Sep. 1, 2000

(86) PCT No.: PCT/SE01/01712

§ 371 (c)(1),
(2), (4) Date: Feb. 20, 2003

(87) PCT Pub. No.: WO02/18177

PCT Pub. Date: Mar. 7, 2002

(30) Foreign Application Priority Data

Sep. 1, 2000 (SE) .............................................. 0003086

(51) Int. Cl.⁷ ............................................... B60R 9/00
(52) U.S. Cl. ...................... 224/319; 224/324; 224/571; 224/553; 224/924; 224/172
(58) Field of Search ................................ 224/924, 172, 224/122.27, 122.29, 319, 324, 571, 553

(56) References Cited

U.S. PATENT DOCUMENTS

| | | | | |
|---|---|---|---|---|
| 3,529,737 A | * | 9/1970 | Daugherty | 414/462 |
| 4,442,961 A | | 4/1984 | Bott | |
| 4,524,893 A | * | 6/1985 | Cole | 224/319 |
| 5,284,282 A | * | 2/1994 | Mottino | 224/310 |
| 5,435,475 A | * | 7/1995 | Hudson et al. | 224/324 |
| 5,607,064 A | * | 3/1997 | Fourel | 211/5 |
| 5,762,248 A | * | 6/1998 | Englander et al. | 224/324 |
| 5,794,828 A | * | 8/1998 | Colan et al. | 224/530 |
| 6,460,743 B2 | * | 10/2002 | Edgerly et al. | 224/324 |

FOREIGN PATENT DOCUMENTS

| | | |
|---|---|---|
| DE | 8813795 | 4/1989 |
| DE | 19927429 | 10/2001 |
| EP | 0482650 | 4/1992 |
| SE | 8901021 | 12/1992 |
| WO | 9011206 | 10/1990 |
| WO | 9507197 | 3/1995 |

* cited by examiner

*Primary Examiner*—Tri M. Mai
(74) *Attorney, Agent, or Firm*—Harness, Dickey & Pierce, P.L.C.

(57) ABSTRACT

The invention concerns a roof-mounted bicycle hodler for vehicles. The bicycle holder comprises profiled carrier (1) on which a bicycle (9) is intended to be positioned in an upright position, first and second fastening devices (2 and 3, respectively) on said profiled carrier (1) for securing said profiled carrier (1) on first and second load carrier rails (4 and 5, respectively), said rails being attached to said vehicle roof (6), and a holding arm (15) pivotally mounted on said profiled carrier (1) for pivotal movement essentially between a release position and a securing position in which said holding arm (15) is attachable to the frame of the bicycle (9). The holding arm (9) is kinetically connected to a stop member (19) arranged, in response to the pivotal movements of the holding arm (15), to be shifted between a blocking position associated with the securing position of the holding arm (15) and a release position associated with the release position of the holding arm (15), said stop member (19) while in its blocking position securing the attachment of the first fastening device (2) to respectively the profiled carrier (1) and the first load-carrier rail (4) and while in its release position allowing said fastening devices to move apart.

15 Claims, 6 Drawing Sheets

BICYCLE HOLDER FOR VEHICLES

TECHNICAL FIELD

The present invention relates to a roof-mounted bicycle holder for vehicles, said bicycle holder comprising a profiled carrier on which a bicycle is intended to be positioned in an upright position, first and second fastening devices on said profiled carrier for securing said profiled carrier on first and second load-carrier rails, respectively, said rails being attached to said vehicle roof, and a holding arm pivotally mounted on said profiled carrier for pivotal movement essentially between a release position and a securing position in which said holding arm is attachable to the bicycle frame.

BACKGROUND OF THE INVENTION

A bicycle holder of the kind described above conventionally comprises an elongate profiled carrier intended to be positioned in the longitudinal direction of the vehicle and to be fastened to a first and a second load-carrier rail, said rails being attached to the vehicle roof, often close to the lateral vehicles edges.

Usually, the bicycle holder is initially fastened by means of the elongate profiled carrier and thereafter the bicycle is fastened to the profiled carrier. The fastening devices could be of a variety of different kinds. One common construction of bicycle holders comprises a profiled carrier arranged so as to be clamped about the front and the rear load-carrier, and a stay means, which is pivotally fastened to the front load-carrier rail. In this position, the stay means may be pivoted upwards and be attached to the frame of the bicycle, and thereafter the bicycle may be transported in an upright position. However, this operation usually is complicated, because it is necessary first to attach the profiled carrier to a load-carrier or equivalent means. Thereafter, the bicycle must be positioned in the holder and be held in position while the stay means is pivoted upwards and is locked to the frame. In addition, the construction suffers from the disadvantage of not being sufficiently tamper-proof, since a potential bicycle thief could easily remove the bicycle along with the bicycle holder attached thereto from the vehicle roof. Moreover, the bicycle holder itself could be wrongfully removed from the vehicle roof when the bicycle holder is empty. Consequently, a separate locking device need be provided to lock the bicycle holder to the vehicle.

OBJECT OF THE INVENTION

In view of the above, the object of the invention is to provide a bicycle holder that is easy to handle while providing safety of fastening both from traffic-hazard and theft points of view.

SUMMARY OF THE INVENTION

These objects are achieved in accordance with the invention in that the holding arm is kinetically connected to a stop member arranged, in response to the pivotal movements of the holding arm, to be shifted between a blocking position associated with the securing position of the holding arm and a release position associated with the release position of the holding arm, said stop member while in its blocking position securing the attachment of the first fastening device to respectively the profiled carrier and the first load-carrier rail and while in its release position allowing said attatchment to be released. Owing to this arrangement, it becomes possible to fasten the profiled carrier to the load-carrier and the bicycle to the profiled carrier in substantially one single step. In addition, this arrangement of the profiled carrier makes it impossible to remove the profiled carrier from the load-carrier as long as the holding arm remains in a securing position. This securing position could be for instance one in which the arm encircles the bicycle frame, or a parking position.

Suitably, the bicycle holder has a locking device comprising an actuating member connected to said first fastening device to actuate said first fastening device between a release position and a fastening position, and a locking means, which is firmly connected to said holding arm and which forms said stop member, said actuating means formed with a blocking edge with which said locking means engages when the actuating means assumes its fastening position and the holding arm assumes its securing position. Owing to this arrangement, it becomes possible to design a simple mechanical structure adapted to realise the above-defined objects. In addition, said locking means preferably is mounted on a holding shaft which is rigidly connected with the holding arm and which extends rotatably across essentially the entire width of the profiled carrier, said shaft forming the centre of rotation of the pivotal motion of the holding arm. The structure provides a possibility of simultaneous attachment in two points, one on either side of the profiled carrier, in order to provide rapid, stable and safe fastening. Preferably, the locking means is formed by a protrusion projecting from said holding shaft and said blocking edge is in the form of an undercut groove made in said actuating member, said protrusion having a shape that essentially is complementary to that of the groove. Preferably, the groove is configured as the segment of a circle and in the fastening position of said actuating member the groove is substantially centred relative to said holding shaft, a constructional feature which makes it possible to obtain the locking effect simply by rotation of the shaft.

In addition, said first fastening device preferably comprises a clamping device intended to engage in an undercut groove or equivalent means formed in said first load-carrier rail. Preferably, the actuating member is formed with a curved cam section and in addition via a rod element it is pivotally connected with a locking body, the latter being adapted for lockable engagement with said groove upon actuation of said actuating member towards said fastening position. The arrangement makes it possible to obtain a mechanically simple construction to effect fastening between the profiled carrier and the load-carrier.

A gripping device intended to grippingly engage the frame of the bicycle is provided on said holding arm, said gripping device comprising a first and a second grip jaw, said jaws arranged to be shifted between a gripping position and a release position. In addition, in their gripping position said gripping jaws preferably cross one another. In this manner, they provide a safe grip around the frame, also small-diameter frames, and the crosswise grip engagement also results in an extension of the force application in the longitudinal direction, a feature which could be advantageous for stability reasons. In addition, said first and second gripping jaws are formed with engaging toothed sections, which contributes to synchronisation of the jaw movements. To obtain such synchrony, it is sufficient to actuate one of the jaws in order to obtain a gripping or release movement, as the case may be.

Suitably, said first gripping jaw is also formed with a locking portion which essentially partly protrudes over a locking area when the jaws assume their gripping position but is essentially retracted from said locking area when the jaws assume their release position. Furthermore, said profiled carrier preferably is formed with a locking pin comprising an abutment face and said holding arm preferably is arranged to be shifted to a parking position, in which the engagement between the profiled carrier and the first load-carrier rail remains, and said locking pin is arranged to be introduced into said locking area, said locking portion arranged to be introduced below said abutment face. In this manner, a theft-proof construction is obtained that prevents theft of the bicycle holder during transportation of said holder alone.

Preferably, while assuming its gripping position, said gripping device may be locked by means of a lock, preferably a key-operated lock. Consequently, without access to the key, it is impossible to remove the bicycle holder from the load-carrier while the bicycle holder is in its secured position or in its parking position.

Furthermore, said second fastening device comprises a coupling arrangement of dove-tail type so as to allow it to be fastened to the second load-carrier rail in a flexible manner. The arrangement allows the bicycle holder to automatically adjust to variations of inclination of the load-carriers relative to one another and thus to the curvature of the vehicle roof, a feature which allows easy fastening of the profiled carrier to the load-carriers.

Finally, the profiled carrier is formed with a first depression in which one of the bicycle wheels is intended to be positioned, said first depression offering sufficient support to said wheel to allow the bicycle to be placed directly in an upright position on the profiled carrier. Therefore there is no need to manually hold the bicycle while the holding arm is pivoted upwards and fastened, which contributes to the possibility of convenient and safe positioning the bicycle on the profiled carrier during attachment as well as transportation.

BRIEF DESCRIPTION OF THE DRAWINGS

The invention will be described in the following in more detail with reference to the accompanying drawings, wherein.

DETAILED DESCRIPTION OF PREFERRED EMBODIMENTS

Figure 1:
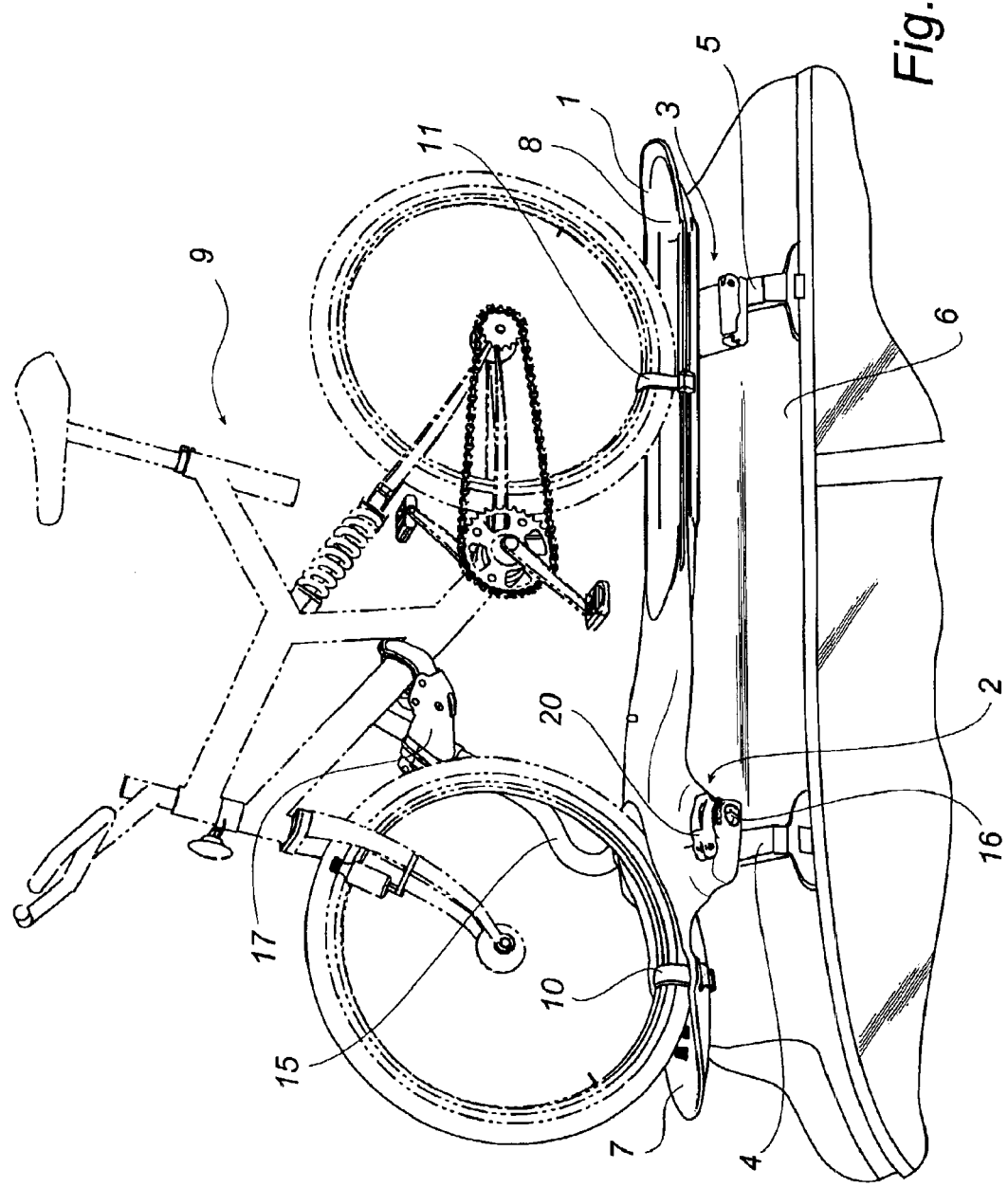
FIG. 1 is a perspective view of a bicycle holder, showing a bicycle in position on the bicycle holder, which is attached to load-carrier rails mounted on a vehicle roof.
Figure 2:
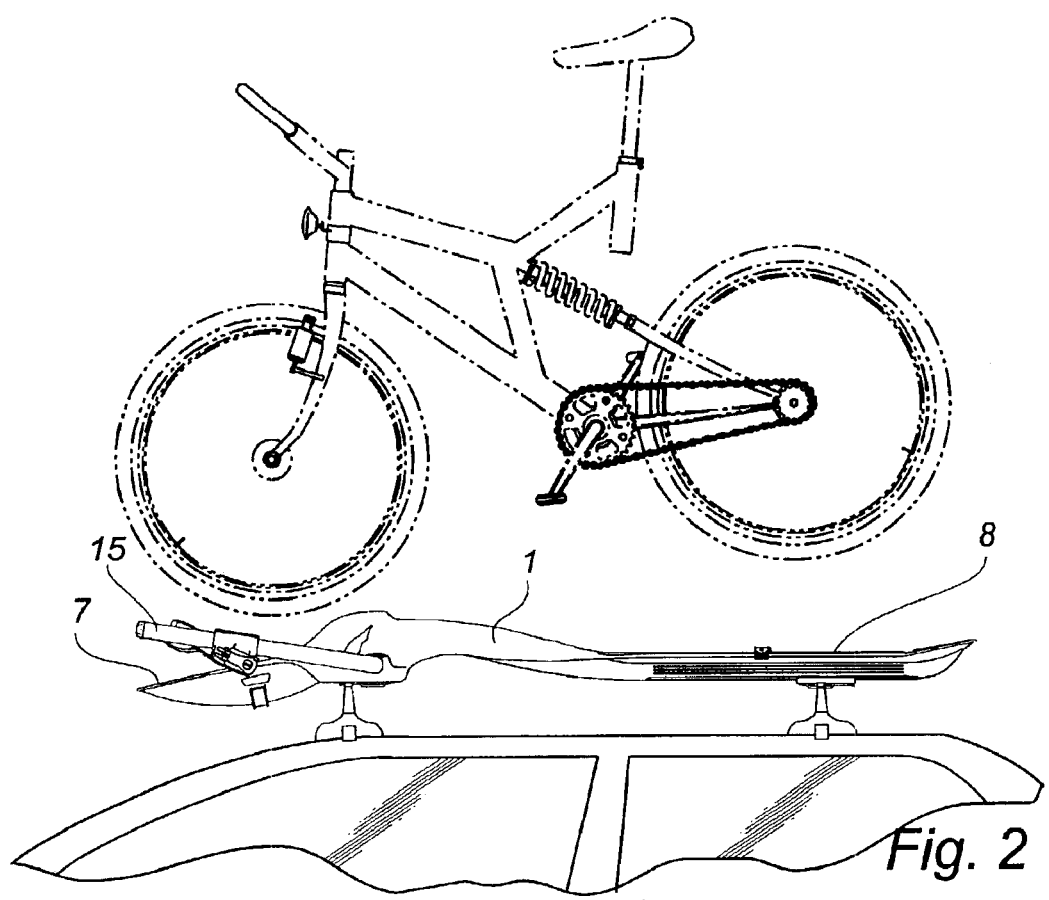
FIG. 2 is a lateral view of the bicycle holder of FIG. 1 in its bicycle-release position.
Figure 3:
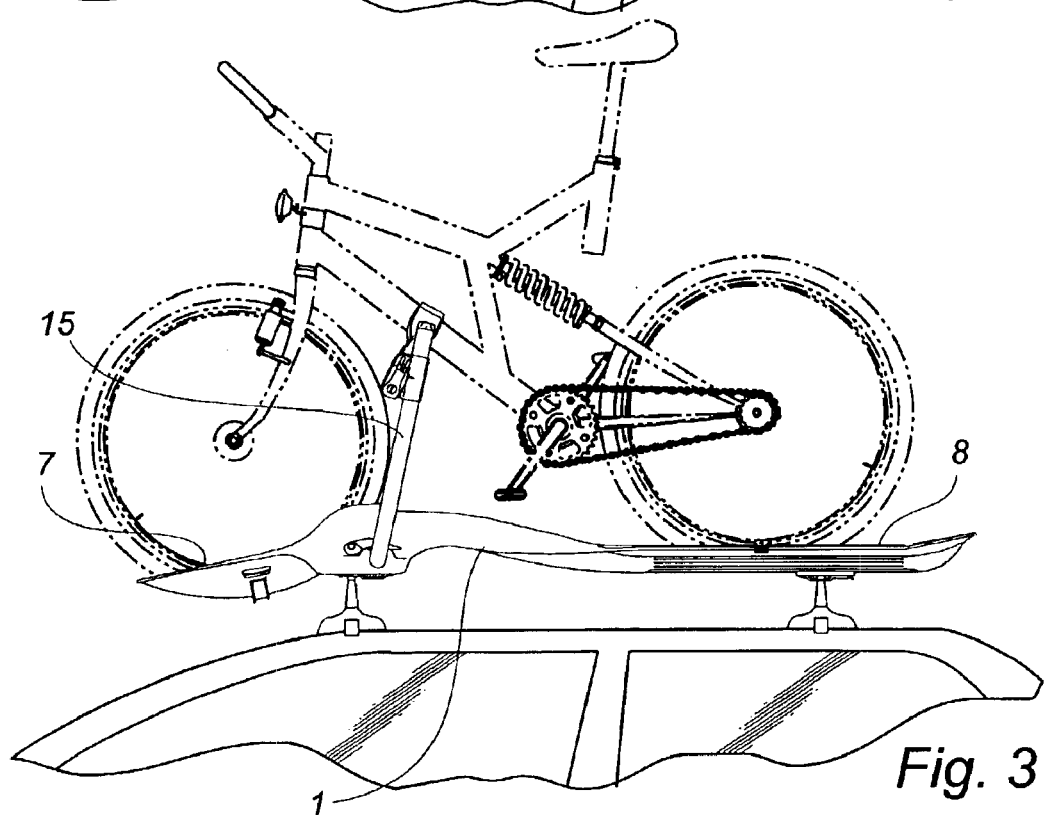
FIG. 3 is a lateral view of the bicycle holder of FIG. 1 in the bicycle-locking position.

FIGS. 1–3 show a bicycle holder of the kind defined in the preamble. The bicycle holder comprises a profiled carrier 1 intended by means of first and second fastening devices 2 and 3, respectively, to be attached to first and second load-carrier rails 4 and 5, respectively. In turn, the load-carriers 4, 5 are fastened to a vehicle roof 6 by means of feet, not to be described herein in detail. The profiled carrier 1 further is formed with a first and a second depression 7 and 8, respectively, in which the front and rear wheel, respectively, of a bicycle 9 are to be supported. The depressions 7, 8 are configured in such a manner that the bicycle 9, once it is placed in the profiled carrier 1, remains in an upright position, also if not otherwise supported. The extension of above all the first depression 7 is such that it offers the bicycle wheel definite lateral support. This design facilitates attachment of the bicycle 1 on the vehicle roof 6. In addition, a first and a second attachment strap 10 and 11, respectively, are arranged on the profiled carrier 1, the first strap 10 on the first depression 7 and the second strap 11 on the second depression 8. These attachment straps are intended to be strapped about the wheels for the purpose of securing the bicycle 9 to the profiled carrier 1. Furthermore, the point of attachment of the second attachment strap 11 is displaceable in the lengthwise direction of the second depression 8 to allow use of the bicycle holder for transportation of differently-sized bicycles.

Figure 10:
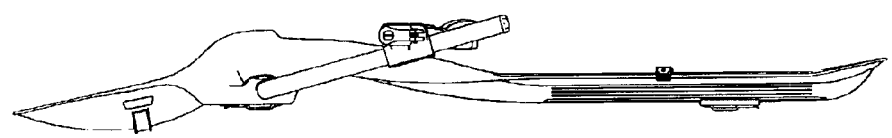
FIG. 10 is a lateral view of the bicycle holder while in a position of transportation of the bicycle holder only, without bicycle.

In addition, a holding arm 15 is arranged on the first fastening devices 20 via a holding shaft 16, which is non-rotationally connected to said arm 15, said holding shaft 16 extending through essentially the entire width of the profiled carrier 2 and being pivotal relative thereto. The holding arm 15 is arranged for pivotal movement relative to the profiled carrier 2 between a release position (see FIG. 7a), a gripping position (see FIG. 7c), and a storage position (see FIG. 10). On the holding arm 15 is also mounted a gripping device 17 intended to grip the frame of a bicycle 9 with a view to provide safe attachment of the bicycle 9 to the profiled carrier 2. The gripping device 17 is also arranged for displacement along and pivotal movement about the holding arm 15 for the purpose of allowing adaptation of the device to bicycles having different frame sizes. The gripping device 17 comprises a first and a second gripping jaw 12 and 13, respectively, which together form a gripping chuck. The inner faces of the gripping jaws 12 and 13, respectively, are covered with a flexible and soft material 14 to allow adaptation to e.g. different bicycle-frame profiles and different inclinations of the frame and to essentially eliminate the risk for scratches to the enamel of the bicycle. In addition, the gripping device 17 comprises a clamping device 18, which is connected to the gripping jaws 12 and 13, respectively, in a force-transferring manner in order to effect closing and opening, respectively, of the jaws.

Figure 4:
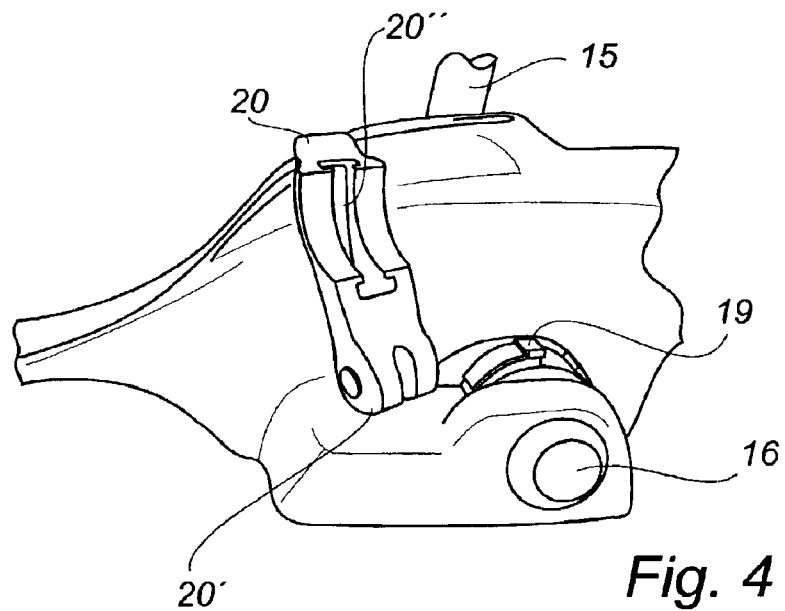
FIG. 4 is a perspective view of a locking mechanism for use together with the bicycle holder in accordance with the invention.
Figure 5:
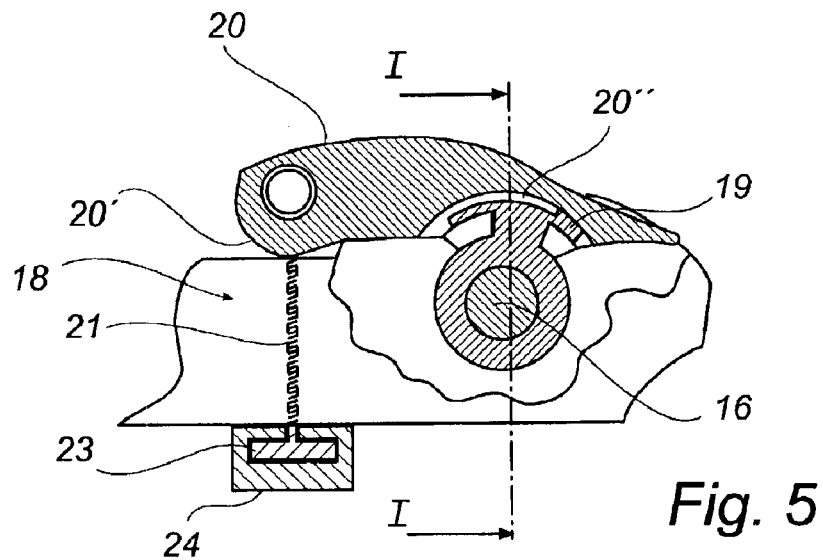
FIG. 5 is a cross-sectional view of the locking mechanism of FIG. 4 in its locked position.
Figure 6:
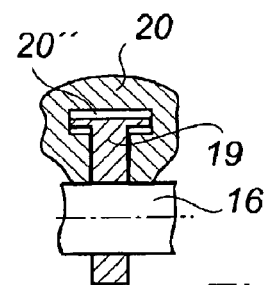
FIG. 6 is a further cross-sectional view of the locking mechanism of FIG. 4, the section being taken along line I—I in FIG. 5.

FIGS. 4–6 illustrate a detail of the locking device in accordance with the invention. FIG. 4 shows the holding shaft 16 mentioned previously, which is non-rotationally connected with the holding arm 15. With the holding shaft 16 is also connected a protrusion 19 having a cross-sectional shape essentially configured as a T-shaped segment of a circle. Preferably, the bicycle holder has one locking device on either side of the profiled carrier to obtain stable and reliable attachment (not shown). FIG. 4 also shows an actuating arm 20, which is connected with a blocking body 23 via a threaded rod member 21 extending through a through-channel 2 formed in the profiled carrier 1, said blocking body 23 intended to be received in an undercut locking groove 24 formed in said first load-carrier rail 4. The actuating arm 20 also is formed with a curved cam section 20', arranged upon rotation of the actuating arm 20 towards a locking position to cause the locking plate 23 to be urged against the upper edges 24' of the locking groove 24. In addition, the actuating arm 20 is formed with a T-shaped groove 24 configured as a segment of a circle, and when the actuating arm 20 assumes its locking position, said groove is essentially centred relative to the holding shaft 16 and to the T-shaped protrusion 19. Upon rotation of the holding arm 15 and consequently of the holding shaft 16 towards the locking position of the holding arm 15, the protrusion consequently is introduced into said T-shaped groove 24 in the actuating arm 20, whereby the actuating arm 20 and consequently the locking plate 23 are blocked in their respective locked positions, when the holding arm 15 assumes its locking position (see FIG. 7c). A cross-section of the T-shaped groove 24 and of the T-shaped protrusion 19, taken along line I—I of FIG. 5, is shown in FIG. 6. The distance from the curved cam section 20' and the locking plate 23 is also variable by screwing the actuating means 20 inwards/outwards relative to the threaded rod element 21.

Figure 7A:
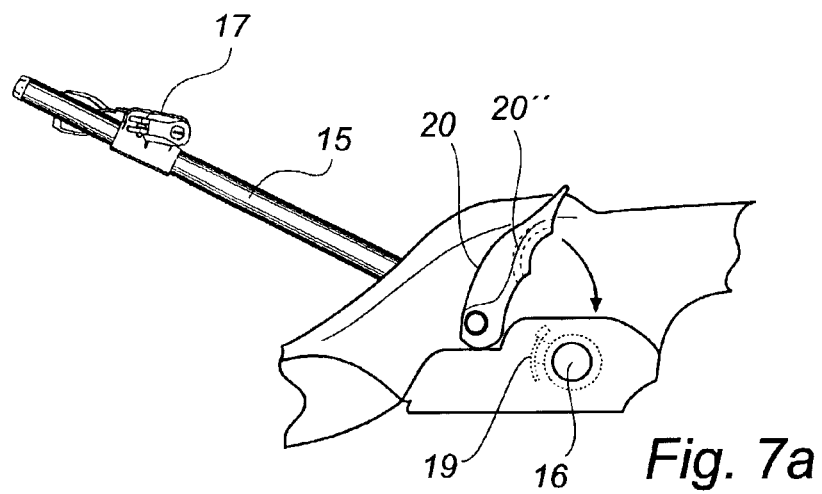
FIGS. 7a–7c show a sequence of operational steps for actuation of the locking device in accordance with the invention.
Figure 7B:
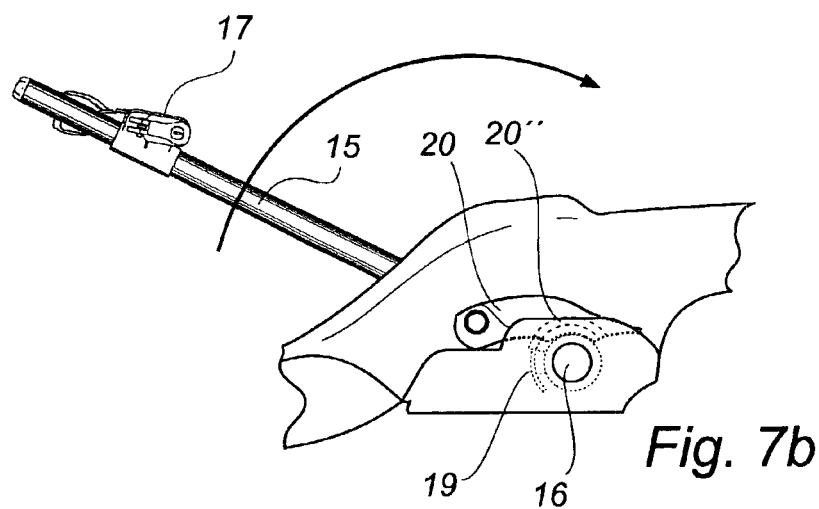
Figure 7C:
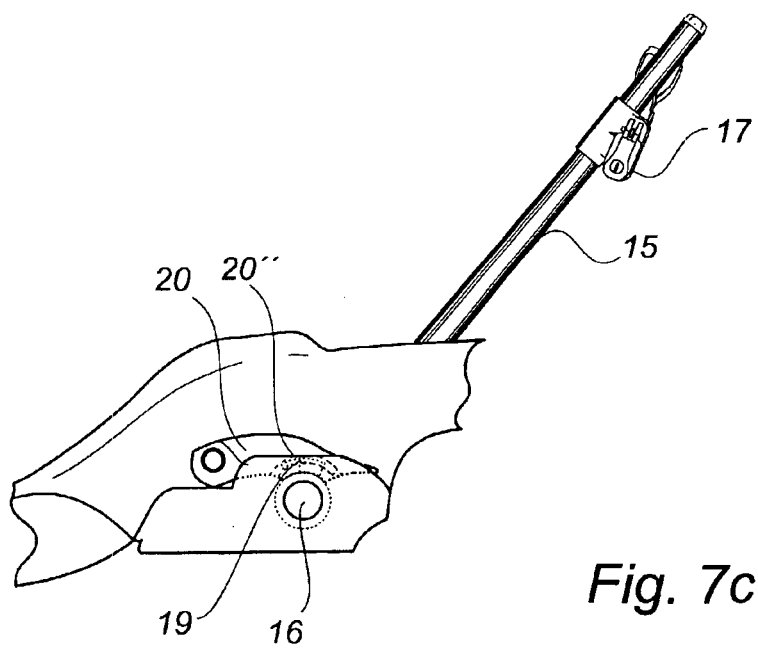

FIGS. 7a–7c show further details of the locking device in accordance with the invention. FIG. 7a shows the holding arm 15, the holding shaft 16 associated therewith, and the actuating arm 20 in their respective release positions. In FIG. 7b the actuating arm 20 has been moved to its locking position (see movement-indicating arrow in FIG. 7a), i.e. in response to cam action the locking plate 23 has been urged against locking groove 24 formed in the first load-carrier rail 4, and in consequence thereof the position of the profiled carrier 1 relative to the load-carrier rail 4 is secured. In FIG. 7c, the holding arm 15 has been moved to its locking position (see movement-indicating arrow in FIG. 7b). As a result of this movement, the T-shaped protrusion 19 on the holding shaft 16 is introduced into the T-shaped groove on the actuating arm 20, whereafter said arm 20 is secured in its then position and cannot be removed unless the holding arm 15 is first to its release position.

As described above, a gripping device 17 is arranged on the holding arm 15. The function of the gripping device 17 is shown in more detail on FIGS. 8a–8c. When the locking device has been moved to the position shown in FIG. 7a, the gripping device 17 is made to grip the frame of the bicycle 9 in the manner illustrated for example in FIG. 1. The gripping device 17 comprises a gripping chuck formed by the previously mentioned first and second gripping jaws 12 and 13, respectively. On their inner faces said gripping jaws are covered with a flexible material 14 serving to provide excellent adaptability to different bicycle-frame dimensions and bicycle-frame sizes, in addition to which the structure distributes the clamping force exerted by the jaws along the frame. Moreover, the gripping jaws 12, 13 cross one another in the gripping position, as most clearly apparent from FIG. 8c. Owing to this jaw arrangement, a secure grip is obtained, also in the case of small-size frames. The gripping jaws 12, 13 are displaceable relative to one another against the action of a clamping device 18 between a release position and a gripping position. The clamping device 18 comprises a clamping arm 25 which, upon rotation of the holding arm 15 towards a locking position in response to cam action, displaces the gripping jaws 12, 13 towards one another for the purpose of gripping the frame. When the holding arm 15 assumes its locking position, it may be secured in that position by means of a key-operated lock 26, shown in FIG. 8c. Thus, the gripping device 17 is secured in the position in which it encircles the frame, the holding arm 15 is secured in the position shown in FIG. 7c, and the locking device 20, 21, 22, 23, 24, shown in FIG. 5, assumes its locking position. Consequently, simultaneous fastening of the profiled carrier 1 to the bicycle frame as well as to the load-carrier rail 4 is achieved, and neither the bicycle 9 itself nor the bicycle 9 jointly with the bicycle holder could be removed from the vehicle under these conditions.

Figure 8A:
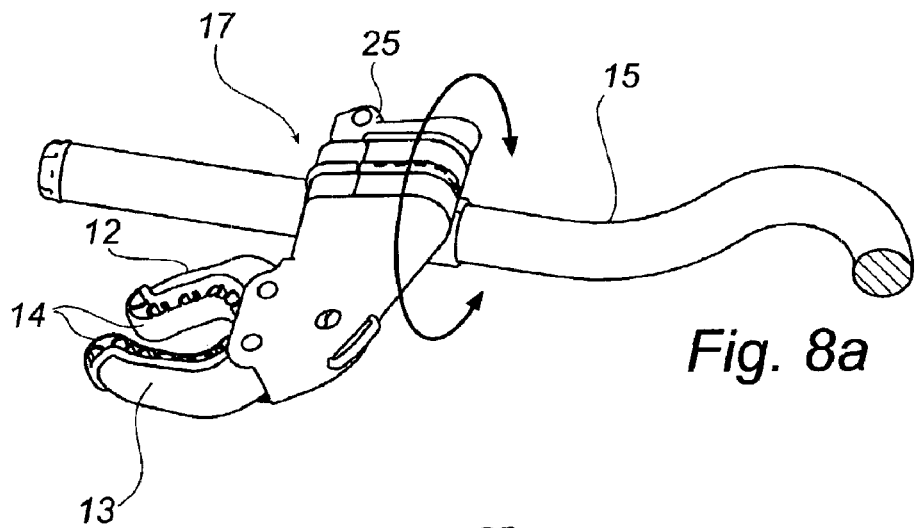
FIGS. 8a–8c shows an additional sequence of operational steps for fastening the locking device to the bicycle frame with the aid of a gripping part.
Figure 8B:
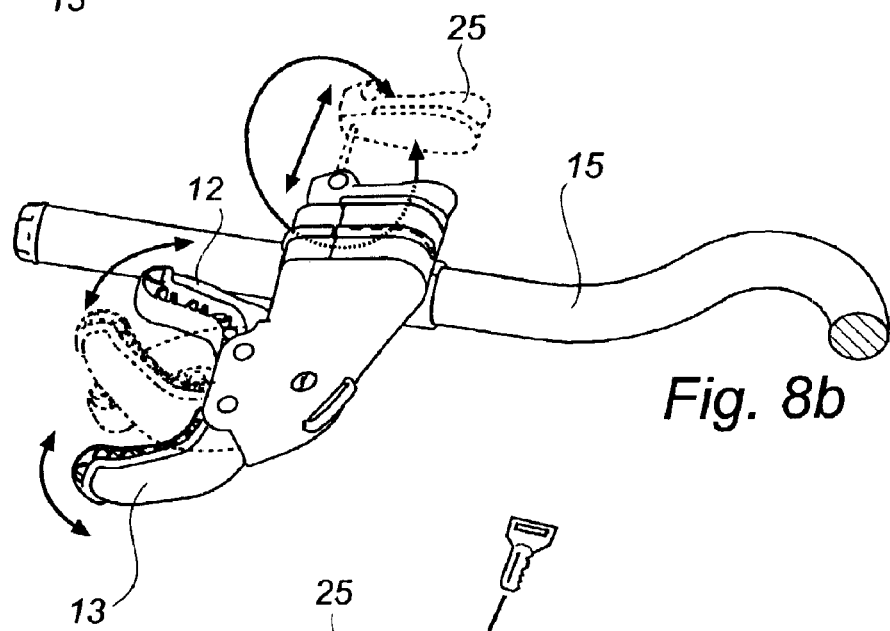
Figure 8C:
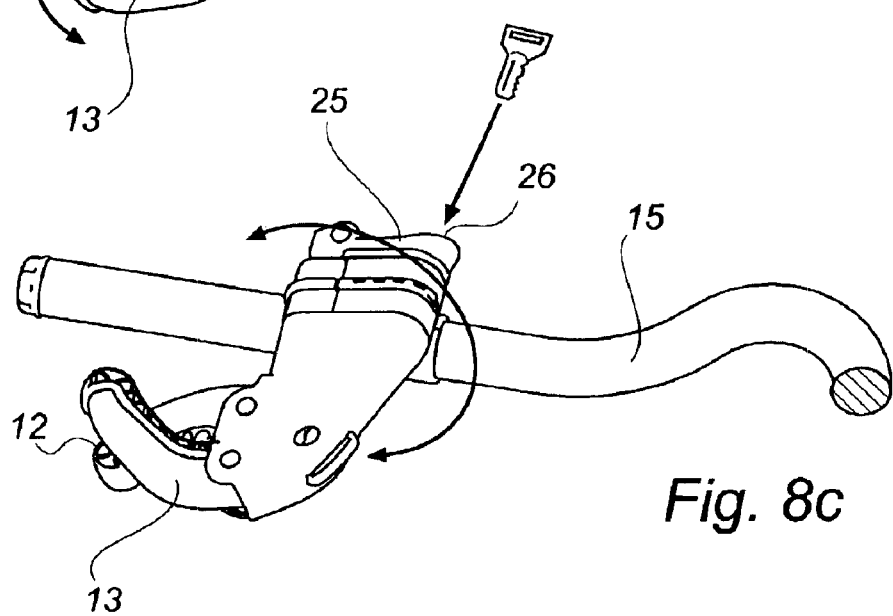
Figure 9:
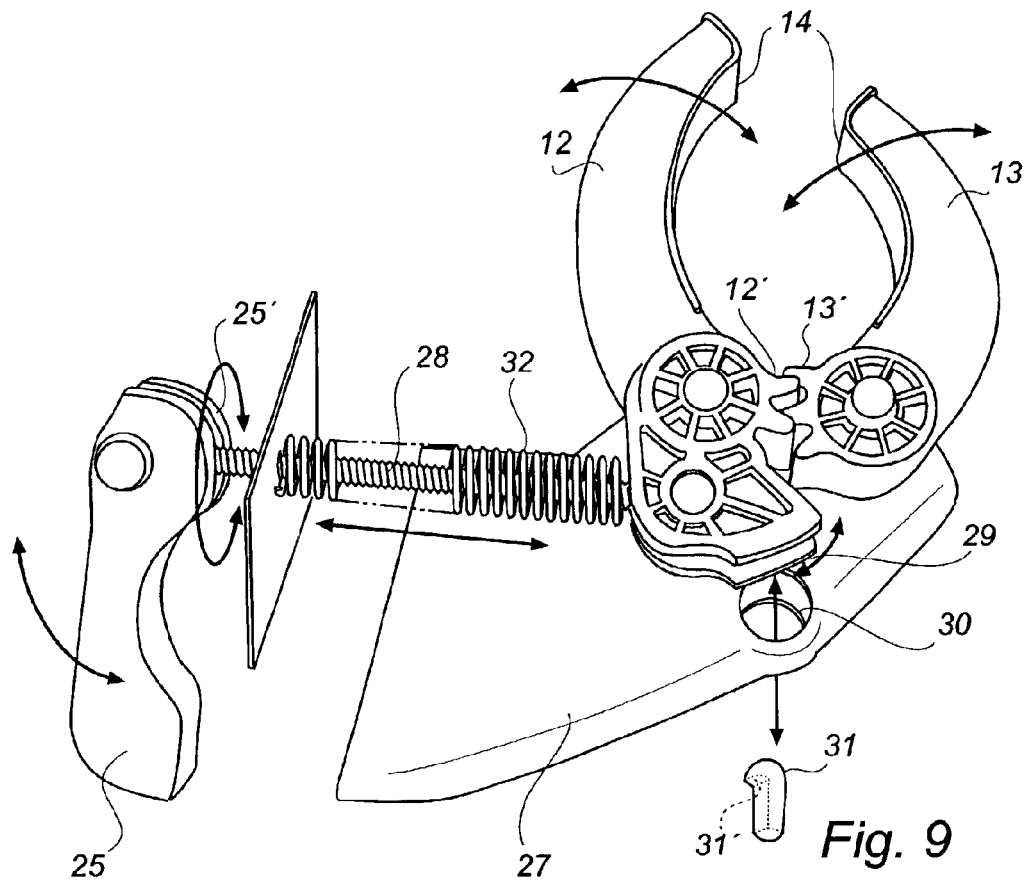
FIG. 9 is a plan view of the internal components of the gripping part of FIGS. 8a–8c (cover removed).

FIG. 9 shows the internal mechanism of the gripping device 17 of FIGS. 8a–8c. A first and a second gripping jaw 12 and 13, respectively, are rotationally attached to a plate 27, which in this case is part of the housing of the gripping part 17, with their pivot axes spaced apart. The gripping jaws 12, 13 also are formed with engaging toothed sections 12', 13'. In addition, the first gripping jaw 12 is connected with the clamping arm 25 via a threaded rod 28, which is in engagement with said first gripping jaw 12. The spacing between the pivot axis of the clamping arm 25 and the first gripping jaw 12 thus is changeable by screwing the actuating means inwards/outwards relative to the threaded rod 28, see FIG. 9. Such screwing movements cause the mutual gripping position of the gripping jaws 12, 13 to change. In addition, said clamping arm 25 is formed with a curved cam section 25' designed to urge the gripping jaws 12, 13 towards a gripping position upon movement of the actuating means towards the locking position shown in FIG. 8c. Furthermore, the structure comprises a spring means 32 placed about the threaded rod 28 and arranged to act on the first gripping jaw 12 and the housing 17, said spring means biasing the gripping jaws 12, 13 towards their mutual release position.

Figure 11:
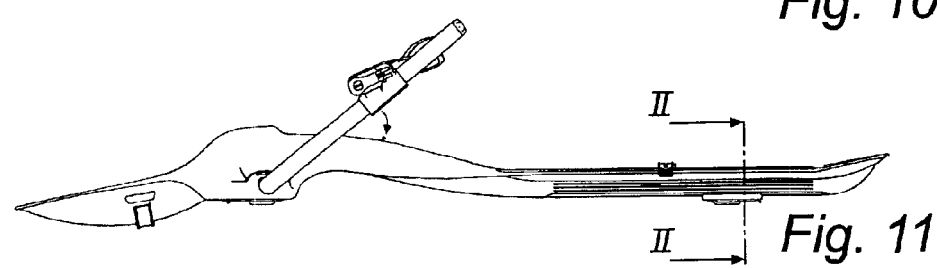
FIG. 11 is a lateral view of the bicycle holder, showing a locking pin used during transportation of the bicycle holder while not supporting a bicycle.

The first gripping jaw 12 also comprises a locking portion 29 which in the locking position of the clamping device 25 covers a part of but not all of the aperture 30 formed in the housing 17 of the gripping device and in the release position of the clamping device 25 is essentially entirely removed from said aperture 30. In addition, on the profiled carrier 1 there is provided a locking pin 31, which is complementary to said aperture 30 and the locking portion 29, see FIG. 11. The position of the locking pin 31 is such as to ensure that the pin may be introduced into said aperture 30 when the holding arm 15 is folded downwards, towards the profiled carrier 1 for transportation purposes (without bicycle), see FIGS. 10 and 11. The locking pin 31 is also formed with an abutment face 31' below which the locking portion 29 is pushed inwards upon pivotal movement of the clamping device 25 from the release position to the locking position. This allows the actuating means to be then secured in that position by means of the key-operated lock 26 shown in FIG. 8c, which in the same manner as described in the aforegoing prevents the bicycle holder from being removed from the vehicle.

Figure 12:
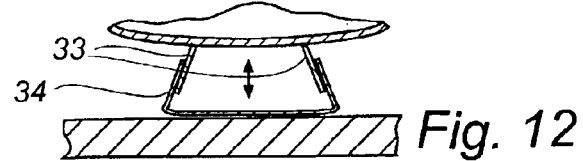
FIG. 12 is a cross-sectional view of a fastening device for the bicycle holder to attach the latter to a rear load-carrier rail, the view taken along line II—II of FIG. 11.

In FIG. 12, finally, is shown the second fastening device 3 having a pair of slightly resilient flanges 33 projecting downwards from the profiled carrier 1 and intended to be received in a channel 34 of complementary configuration, comprising inwardly inclined outer faces. However, it is sufficient to make only either the outer faces or the flanges resilient. This structure provides some flexibility in the means interconnecting the channel and the profiled carrier, ensuring safe and stable attachment function, also when the vehicle roof is not flat and the load-carriers consequently are somewhat angularly displaced relative to one another. In addition, said channel 34 may be formed directly in the second load-carrier 5 or in an intermediary component, see FIG. 1.

It should be appreciated that a number of embodiments of the invention are possible without departing from the inventive idea. For example, the gripping device could be designed in a variety of ways as regards the shape and the mechanical structure of the gripping jaws. In addition, the fastening devices with respect to the load-carrier rails could be varied; for instance means extending around the load-carrier rails could be used instead of grooves formed in the rails.

What is claimed is:

1. A roof-mounted bicycle holder for vehicles, said bicycle holder comprising a profiled carrier on which a bicycle is intended to be positioned in an upright position, first and second fastening devices on said profiled carrier for securing said profiled carrier on first and second load-carrier rails, said rails being attached to said vehicle roof, and a holding arm pivotally mounted on said profiled carrier for pivotal movement essentially between a release position and a securing position in which said holding arm is attachable to the frame of the bicycle, wherein said bicycle holder has a locking device comprising an actuating member connected to said first fastening device to actuate said first fastening device between a release position and a fastening position, wherein said actuating member comprises a blocking edge in the form of an undercut groove made in said actuating member, and in that the holding arm is kinetically rigidly connected to a locking means arranged, in response to the pivotal movements of the holding arm, to be shifted between a blocking position associated with the securing position of the holding arm and a release position associated with the release position of the holding arm, wherein the locking means has a shape that essentially is complementary to that of said undercut groove of the actuating member and wherein said locking means is arranged to engage with said said undercut groove when the actuating means assumes its fastening position and the holding arm assumes its securing position.

2. A bicycle holder as claimed in claim 1, wherein said locking means while in its blocking position is arranged to secure the attachment of the first fastening device to respectively the profiled carrier and the first load carrier rail and while in its release position is arranged to allow said attachment to be released.

3. A bicycle holder as claimed in claim 2, wherein said locking means is mounted on a holding shaft, which is rigidly connected with the holding arm and which extends routably across essentially the entire width of the profiled carrier, said shaft forming the centre of rotation of the pivotal motion of the holding arm.

4. A locking device as claimed in claim 3, wherein said locking means is formed by a protrusion projecting from said holding shaft.

5. A locking device as claimed in claim 4, wherein said groove is configured essentially as the segment of a circle and in that in the fastening position of said actuating member the groove is substantially centered relative to said holding shaft.

6. A locking device as claimed in claim 2, wherein said first fastening device comprises a clamping device arranged to engage in an undercut groove formed in said first load-carrier rail.

7. A locking device as claimed in claim 6, wherein the actuating member is formed with a curved cam section and in addition via a rod element it is pivotally connected with a locking body, the latter being adapted for lockable engagement with said groove in the first load-carrier rail upon actuation of said actuating member towards said fastening position.

8. A locking device as claimed in claim 1, wherein a gripping device, which is arranged to grippingly engage the frame of the bicycle is provided on said holding arm, said gripping device comprising a first and a second grip jaw, said jaws arranged to be shifted between a gripping position and a release position.

9. A locking device as claimed in claim 8, wherein in their gripping position said gripping jaws cross one another.

10. A locking device as claimed in claim 8, wherein said first and second gripping jaws are formed with engaging toothed sections.

11. A locking device as claimed in claim 10, wherein said first gripping jaw is also formed with a locking portion, which essentially partly protrudes over a locking area when the jaws assume is essentially retracted from jaws assume their release position.

12. A locking device as claimed in claim 11, wherein said profiled carrier is formed with a locking pin comprising an abutment face and said holding arm is arranged to be shifted to a parking position, in which the engagement between the profiled carrier and the first load-carrier rail remains, and in that said locking pin is arranged to be introduced into said locking area, said locking portion arranged to be introduced below said abutment face.

13. A locking device as claimed in any one of claims 8, wherein said gripping device may be locked in its gripping position by means of a lock, preferably a key-operated lock.

14. A locking device as claimed in claim 1, wherein said second fastening device comprises a coupling arrangement of dove-tail type so as to allow it to be fastened to the second load-carrier rail in a flexible manner.

15. A locking device as claimed in claim 1, wherein the profiled carrier is formed with a first depression in which one of the wheels of the bicycle is intended to be positioned, said first depression offering sufficient support to said wheel to allow the bicycle to be placed directly in an upright position on the profiled carrier.

* * * * *

UNITED STATES PATENT AND TRADEMARK OFFICE
CERTIFICATE OF CORRECTION

PATENT NO. : 6,892,913 B1
DATED : May 17, 2005
INVENTOR(S) : Gøran Andersson

It is certified that error appears in the above-identified patent and that said Letters Patent is hereby corrected as shown below:

<u>Title page,</u>
Item [22], PCT Filed, change "Sep. 1, 2000" to -- August 7, 2001 --.

Signed and Sealed this

Eleventh Day of October, 2005

JON W. DUDAS
*Director of the United States Patent and Trademark Office*